4 Sheets--Sheet 1.

J. KING.

Improvement in Apparatus for the Manufacture of Cube-Sugar.

No. 128,964. Patented July 16, 1872.

Witnesses:
J. E. Brecht.
J. A. Lowndes

Inventor:
Julius King
By N. Crawford
atty.

AM. PHOTO-LITHOGRAPHIC CO. N.Y. (OSBORNE'S PROCESS.)

4 Sheets--Sheet 2.

J. KING.

Improvement in Apparatus for the Manufacture of Cube-Sugar.

No. 128,964. Patented July 16, 1872.

4 Sheets--Sheet 3.

J. KING.
Improvement in Apparatus for the Manufacture of Cube-Sugar.

No. 128,964. Patented July 16, 1872.

Witnesses:
T. C. Brecht.
J. A. Lowndes

Inventor:
Julius King
By N. Cramford
atty.

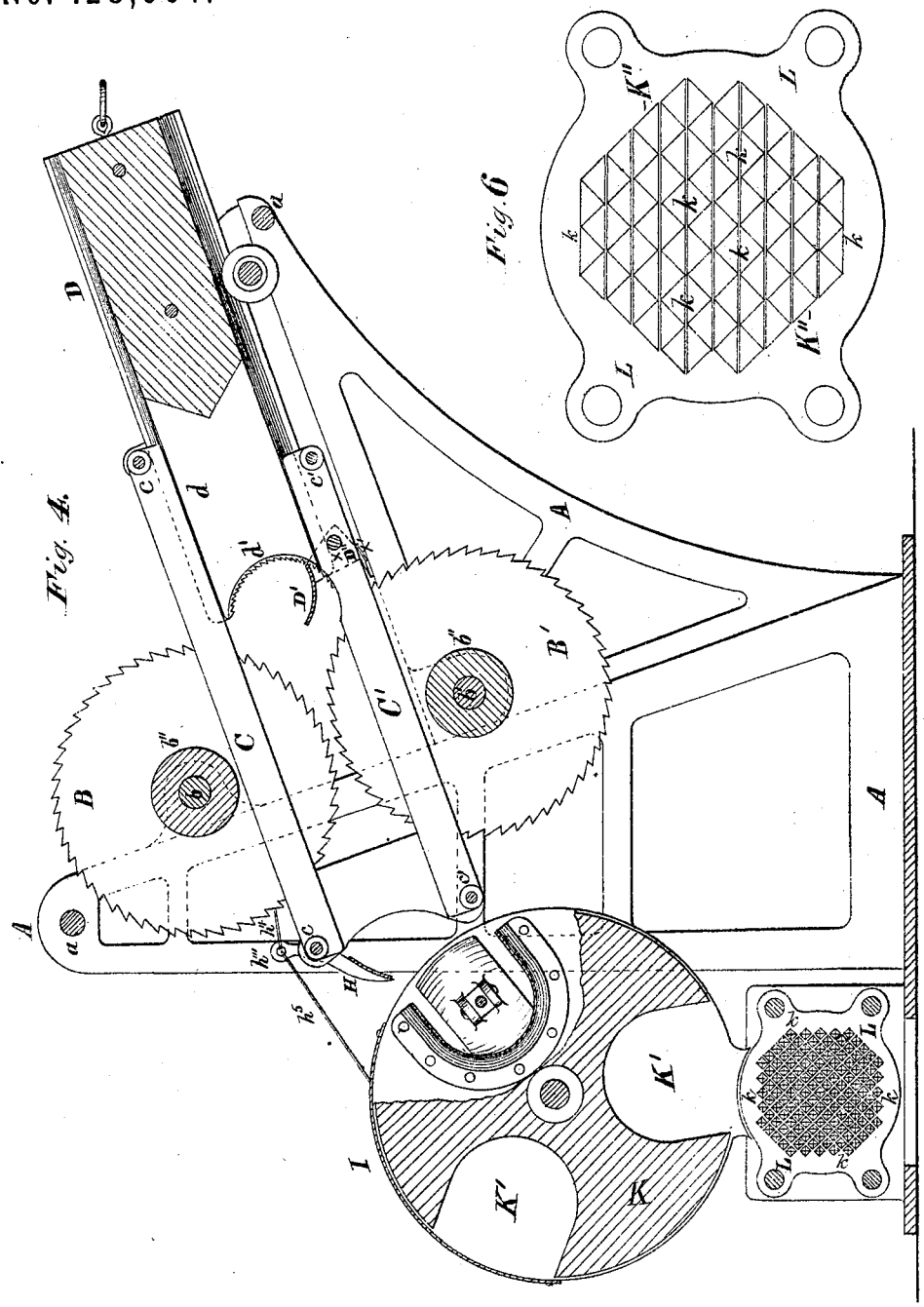

128,964

UNITED STATES PATENT OFFICE.

JULIUS KING, OF HOBOKEN, NEW JERSEY, ASSIGNOR TO CARSON SIERCK, OF SAME PLACE.

IMPROVEMENT IN APPARATUS FOR THE MANUFACTURE OF CUBE SUGAR.

Specification forming part of Letters Patent No. 128,964, dated July 16, 1872.

I, JULIUS KING, of Hoboken, in the county of Hudson, in the State of New Jersey, have made certain Improvements in Machines for making Cube or Block of Sugar from the Loaf, of which the following is a specification:

The object of this invention is to produce a machine that will make cubes or blocks of sugar from the loaf or cone with greater dispatch, more certainty, with less labor in attendance, and producing a greater proportion of perfect cubes or blocks than by any other method known by this applicant; and it consists in the construction, arrangement, and combination of the parts that make up the machine, as will be more fully hereinafter described.

Figure 1:
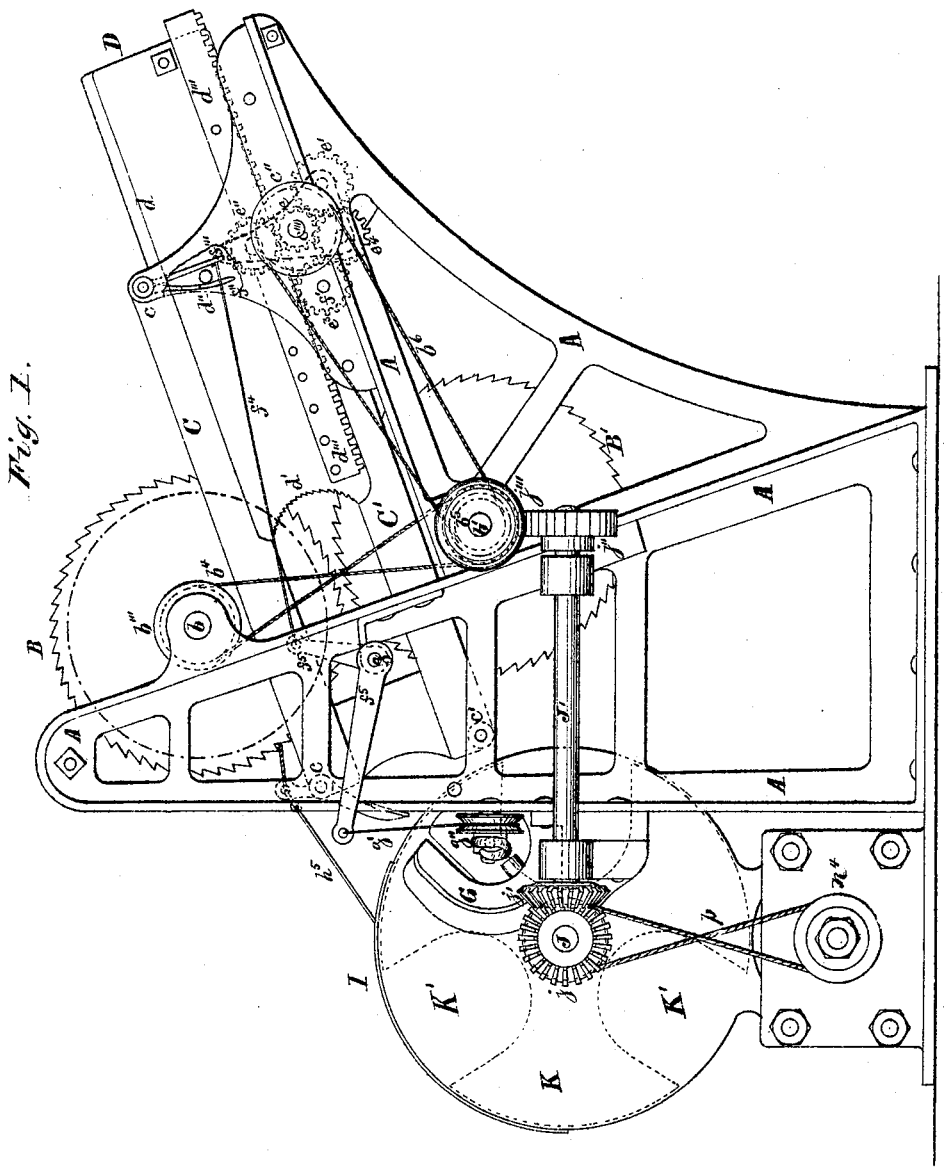
Figure 2:
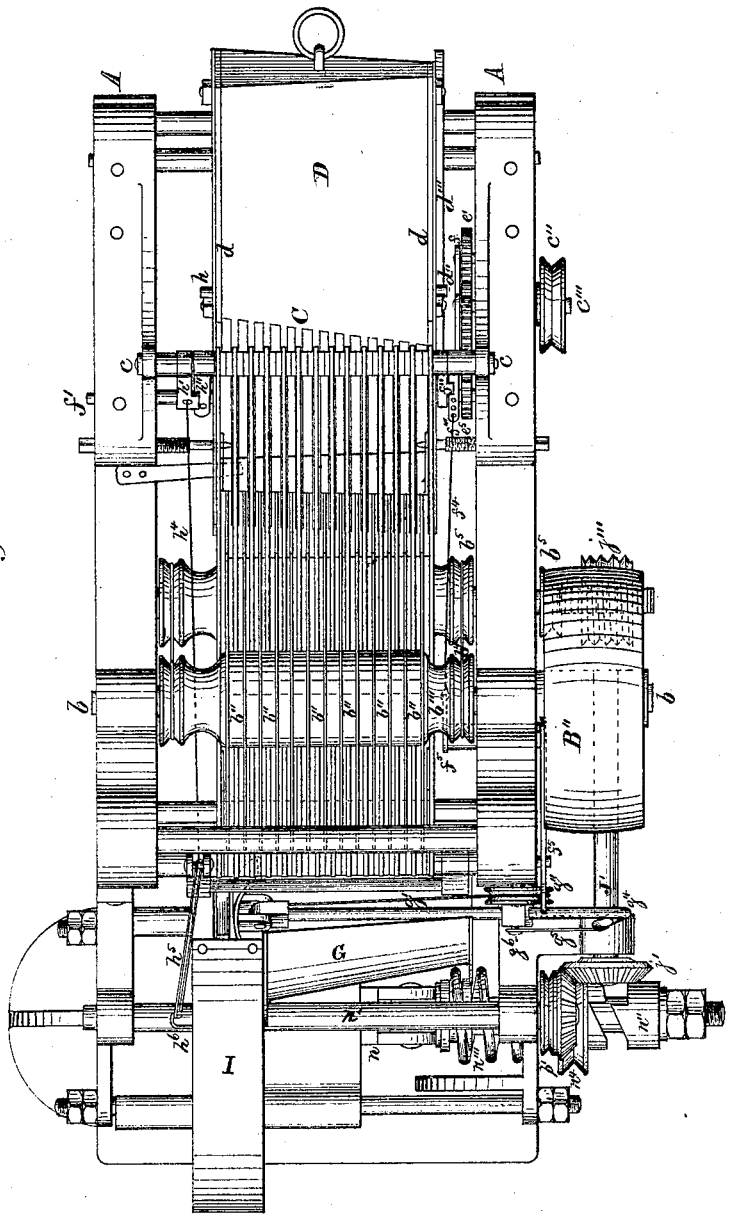
Figure 3:
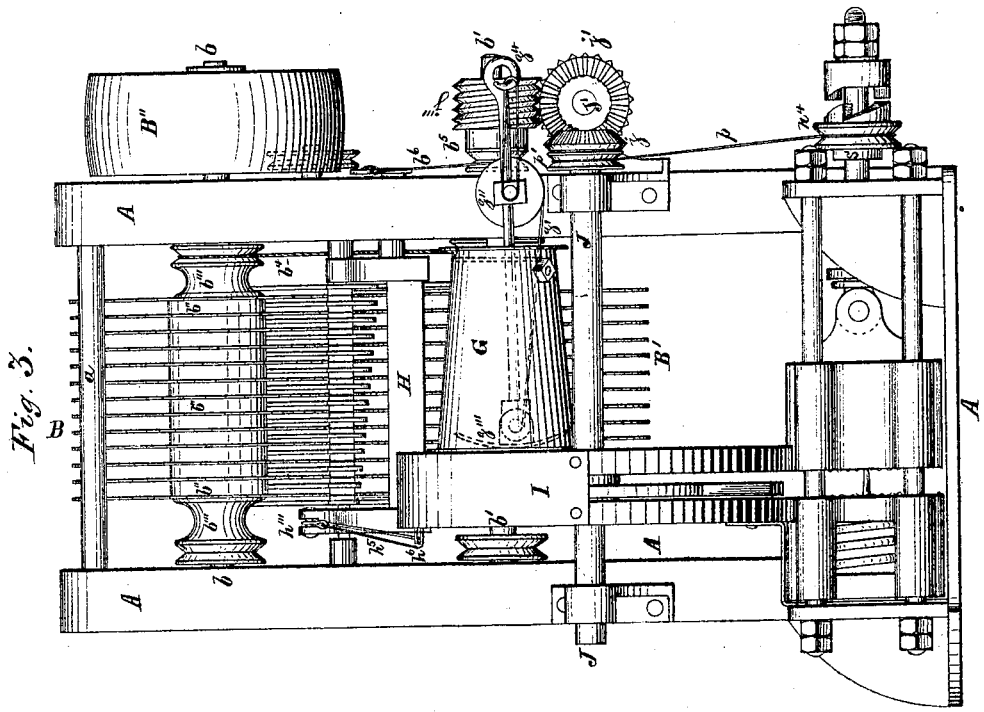
Figure 5:
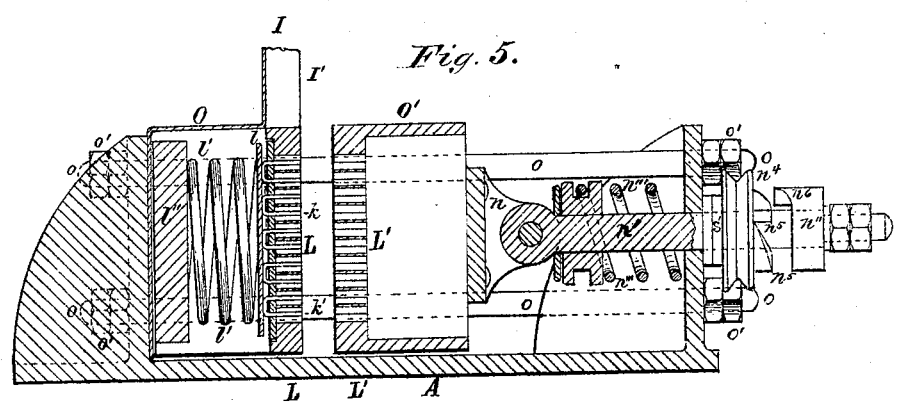

In the drawing, Figure 1 represents a side elevation of the machine; Fig. 2, a plan or top view; Fig. 3, an upright rear end view; Fig. 4, sectional upright view; Fig. 5, detail of parts; and Fig. 6 is an enlarged view, showing the checking or cutting-knives of the crushing-jaws as formed in the several plates that make the face of the jaws.

A represents the frame that supports the operating parts of the machine, and strengthened by the transverse rods $a$. B and B' are series of circular saws running in opposite directions of revolution, and fixed in any secure manner upon transverse shafts or arbors $b$ and $b'$. As many of these saws are employed on each arbor as is necessary to cut a loaf of sugar into disks of proper thickness. B'' is the main driving-pulley, is fast on shaft or arbor $b$, and is revolved by a belt from any proper power. $b'''$ is a pulley on one end of shaft $b$, with a cross-band or belt, $b^4$, around it and around pulley $b^5$ on shaft $b'$, by which revolution is given to shaft $b'$ and saws B'. Pulleys similar to pulleys $b'''$ and $b^5$ are placed and fixed upon the opposite ends of shafts $b$ and $b'$, with a band around them when necessary to assist in revolving shaft $b'$ and saws B'. $b''$ $b''$ are rings or disks between the circular saws B and B' on shafts $b$ and $b'$ to give the distance between the saws, and by which the saws are held apart from each other, so that the disk of sugar cut from the loaf can pass freely between the saws of both series. C C' are series of metal guides that pass between the series of circular saws B and B', and are secured in position to transverse rods $c$ and $c'$, that are attached to frame A, and also serve to guide the feed. Between each of these individual guides and around rods $c$ and $c'$ are washers or rings to keep them at the proper distance apart, and secure them in their proper position, and are deeper on one side than on the other, in order to receive between them the tapering loaf of sugar. D is a reciprocating feeder or forcer, is inclined in its position with relation to the machine, its forward end being the lowest, and in cross-section has the same taper or inclination as the loaf of sugar. $d$ $d$ are metal sides of the feeder, are wider than the feeder is thick, so that the parts projecting above and below serve to be guided by the outer bars of the series of metal guides C, are cut in circular form at their forward ends, and serrated at $d'$, as seen in Figs. 1 and 4, in order to hold the loaf or cone of sugar from revolving when the saws strike it. The reciprocating feeder is slotted about one-half of its length from the forward end, so that in feeding the loaf or cone of sugar to the saws, the saws will enter into the slots, and that part of the feeder between the slots will pass between the saws and bear against each disk of sugar as cut from the loaf or cone until the loaf is completely cut into disks. $d''$ is a projecting trippin, on the side of the feeder D, and its office will be described hereafter. $d'''$ is the toothed rack-bar, secured to the side of the feeder D, and by which the feeder is reciprocated. Upon shaft $b'$ and outside of frame A is pulley $b^5$, which revolves with said shaft $b'$, and around said pulley $b^5$ is a band, $b^6$, which extends back and around pulley $c''$ on shaft $c'''$, which is also outside of frame A, and journaled into and revolving in said frame in a proper bearing. $e$ is a toothed pinion, fast on shaft $c'''$, and inside of the frame A, and revolves with the shaft $c'''$. $e'$, $e''$, and $e^4$ are toothed pinions or wheels journaled in and to oscillating plate $f$, that is pivoted to and vibrates upon shaft $c'''$, and causes this train of gear-wheels to vibrate also. Plate $f$ extends upward above the gear-wheels, and is connected to a swinging-arm, $f'''$, on transverse rod $c$ by a rod, so that as the feeder D is reciprocated by means of the pinion $e^3$ fast on transverse shaft $f'$ through the toothed pinion $e^5$, loose on a clutch-sleeve on said shaft $f'$, and being in gear with pinion $e^4$, and that with $e'$ and $e$, and so that when the trip-pin $d''$ shall strike the swinging arm $f''$ and force it and the swinging arm $f'''$ with it in one direction will cause the oscillating plate $f$ to throw wheel $e^4$ into gear with wheel $e^5$, which reverses the motion by changing the pinion $e''$ that was in gear to be out of gear with pinion or wheel $e^5$ and $e^4$ in gear with it. In reversing the movement of feeder D by vibrating the plate $f$, the pinion $e^5$ is revolved nearly one revolution before motion is communicated to shaft $f'$ by its being attached to the loose clutch-sleeve around shaft $f'$, as there is a clutch-pin in said shaft $f'$ and another in the loose clutch-sleeve, they revolve the wheel or pinion $e^5$ in either direction, the pin on the clutch-sleeve will turn without revolving shaft $f'$ until it strikes the pin in said shaft, when shaft $f'$ is forced to revolve in that direction until the oscillating plate $f$ takes that wheel out of gear with pinion $e^5$ and forces another in gear, when the direction of revolution in wheel $e^5$ will be reversed, as well as the feeder D will reciprocate in the opposite direction. $f^4$ is a connecting-rod, with one end attached to swinging arm $f'''$ and the other to an upright arm of a bell-crank, $f^5$, which vibrates on a horizontal shaft, $g$, and at the end of the horizontal arm of the bell-crank is cord $g'$ dropping down around idle pulley $g''$, and thence horizontally to be attached to plunger or follower $g'''$ in the disk-receiver, to which plunger is hinged a rod, $g^4$. To the end of the rod is secured a spiral or other spring, $g^5$, while the other end of the spring is attached to stud $g^6$. G is a conical-shaped receiver to receive the disks of sugar cut by the saws B and B'; is open on the side next or toward the saws. D' is a concave table to rest a loaf of sugar upon when placed in the machine to be sawed and while the feeder D is at rest, and is pivoted to a horizontal transverse rod $x$ with its lower end D'' bearing upon spring $x'$, so that when the feeder D is drawn or forced outward to receive the loaf of sugar the spring forces the table upward into the position seen in Fig. 4; but as the feeder D advances against the loaf or cone of sugar the table is forced down out of the path of the feeder by the giving away of the spring $x'$ underneath, which allows the loaf of sugar to be presented to the two series of saws B and B', and be cut by the saws into disks of the thickness of the future block or cube, and as the loaf is so cut into disks by the saws passing completely through the loaf, the disks pass forward and against the halting or retaining and swinging door H, which is pivoted to swing around transverse rod $c$ with an upwardly-extending arm, $h'''$, to which is a rod, $h^4$, attached, and extends back to and connected to a pendent swinging arm, $h'$, that swings on rod $c$ at the rear part of the machine, and as pin $h$ on the reciprocating feeder strikes a swinging arm, $h''$, in its outward reciprocation it carries arm $h'$ along with it until the trip-pin will pass under said arm $h''$, when the arm $h'$ is relieved, and spring $h^5$, one end of which is attached to the upwardly-projecting arm $h'''$ of door H, and the other to a stud or staple, $h^6$, will act to close the door down again after the disks of sugar have passed out of the retarding-door and have passed into the receiver G. I is a stationary drum composed of two parallel sides, circular in form, and covered around a portion of their tops, and the inner sides are lined with card-wire or springs I' to retard the disks of sugar from dropping ahead of their required time. The side of the drum I next the disk-receiver G is cut away so that the disk of sugar can freely pass through the opening, which corresponds in shape with the adjacent and large end of the disk-receiver. J is a horizontal shaft journaled in proper bearings at or near either end. K is a revolving feeding disk-wheel fast on shaft J, and revolves with it and within the drum I, and has three or more openings, K', equally distributed as to the distance in its circumference, which openings correspond in shape to the openings in the inner side of the drum and end of sugar-disk receiver, and gets its motion from screw or other gear on transverse shaft $b'$ gearing into gear-wheel $j''$ on shaft J', having gear-wheel $j'$ that gears into wheel $j$ on shaft J. Underneath the revolving disk-feeder K is the ram or cube-cutter, that cuts the disks of sugar, that are fed in regular order to it by the disk-feeder K, into cubes, and is composed of the stationary or idle jaw, cutter, or breaker L, and reciprocating jaw, cutter, or breaker L', both secured in strong heads O and O', which are secured on guide-rods $o$ $o$, that are made fast to the frame A by nuts $o'$ $o'$ at either end in order to resist the strain that is put upon them in cutting or checking the sugar-disks into cubes. The jaw L is placed directly underneath the outer side of drum I, and the cutting or checking knives are made up of a series of sharp-edged and corrugated pieces of steel plates, K''. The corrugations are so arranged that quadrangular checks $k$ are formed the size of the cubes or thickness of the disks cut from the loaf; or such checks may be formed by other forms of checking-face; but the corrugated form is preferable. In the center of each of these checks $k$ protrudes a small pin, $k'$, which pins pass through the jaw L and bear against plate $l$, with a spiral spring, $l'$, bearing against it, while the outside end of the spring $l'$ bears against the jam-plate $l''$, which force the cubes out of the checks. The jaw L' is made to reciprocate upon guide-rods $o$ $o$, and contains on its face the same kind of cutters or checks that are described as being in jaw L. $n$ is a slotted eye that is made fast to the reciprocating jaw L', and to which is pivoted a piston-rod, $n'$, extending in a horizontal position through the side of the frame A, and outside of the frame and revolving upon the rod $n'$ is pulley $n^4$, made to revolve by the crossed band $p$ coming from the pulley $p'$ in horizontal shaft J. $n''$ is a nut fast on rod $n'$ by being keyed, to prevent its turning, and has a single projecting tooth, $n^6$, having an inclined or angular face, and the other side at right angles with the face of the nut. Projecting from the face of pulley $n^4$ are three or more angular teeth, $n^5$, the same in form as the tooth $n^6$ on nut $n''$. $s$ is a washer, fast on rod $n'$, and bearing against the inside of pulley $n^4$, so that as pulley $n^4$ revolves, and the angular side of one of its projecting teeth $n^5$ strikes against the angular side of tooth $n^6$ on fast nut $n''$, it will force the piston-rod $n'$ and jaw $L'$ toward jaw L the distance that the tooth may project, and as soon as the point of tooth $n^5$ on pulley $n^4$ has passed the point of tooth $n^6$ on nut $n''$, the spiral or other spring $n'''$ around rod $n'$ will force the washer $s$ against which it bears, and with it the pulley $n^4$, rod $n'$, and jaw $L'$ until the points of the teeth $n^5$ will strike the face part of nut $n''$, and thus the jaws L and $L'$ will separate and remain so until, by the revolution of pulley $n^4$, the next tooth $n^5$ strikes against tooth $n^6$, when the jaw $L'$ will be again forced toward jaw L, and repeating this reciprocation as many times as there are teeth on pulley $n^4$ at every revolution of said pulley $n^4$.

Operation.

The reciprocating feeder D is in position as seen in Fig. 4. The loaf or cone of sugar is placed upon the spring table $D'$ in a horizontal position, and presenting the side of the loaf to the saws, the saws being in motion, the feeder advances and forces the loaf forward to the saws, and at the same time forces the table $D'$ down and out of the way, while the feeder continues to force the sugar-loaf entirely through the saws, by which the loaf is cut into thin slices or disks of the thickness of the cubes and distance between the saws, and when at this point the train of gear that forces the feeder D toward the saw is reversed by throwing one wheel of the train out of gear with the driving-wheel, and another in gear; when the feeder D is reciprocated in the reverse direction to the position shown in Fig. 4, when the gear will again be reversed, but the feeder will halt a moment, or so long as it takes the driving-wheel to make nearly a revolution. When the second loaf of sugar is placed on the table $D'$, and when the feeder is at the position above stated, the retaining door H will be opened, and the disks previously cut by the saws will pass into the disk-receiver G, as the extreme backward reciprocation of the feeder will cause the plunger $g'''$ to be drawn back far enough for all the disks to fall into the receiver G, when the plunger will be released, so that a forcing spring keeps it against the disks that are now standing on their edges in the receiver, and pushes the disks toward the drum I and through the opening in the side of the drum, and against the side of the revolving feeding-disk K, and as one of the openings $K'$ in said disk K comes coincident with the opening in the inner side of the drum, the plunger will force a disk of sugar into the opening $K'$ in the revolving disk, and its revolution carry it forward, and until the opening $K'$ is vertical, and over the now open jaws L and $L'$, when it falls between them, and held in position on its edge until jaw $L'$ is forced against it and the sharp edges of the corrugated knives or checks crack the disk through, so that when the jaw $L'$ is again opened the little pins and springs behind them will force the now completed cubes or blocks out of the knives or checks, when they fall of their own gravity through an opening underneath the jaws into any receptacle to receive them.

Having thus described my invention, what I claim, and desire to secure by Letters Patent, is—

1. The slotted reciprocating feeder D, having the circular serrated teeth $d'$, in the manner and for the purpose substantially as described.

2. The series of circular saws B and $B'$ running in opposite directions, in combination with the reciprocating feeder D, constructed to operate in the manner described.

3. The spring-table or rest $D'$ in combination with the feeder D, in the manner and for the purpose substantially as described.

4. The retaining door H in combination with the reciprocating feeder D, in the manner and for the purpose substantially as described.

5. The series of guides C and $C'$, the bars of which gradually diminish in width toward the opposite side, in combination with the slotted reciprocating feeder D, having one side thicker than the other, and projecting guide-plates $d$ and series of saws B and $B'$, substantially in the manner and for the purpose described.

6. The disk-receiver G in combination with the spring-plunger $g'''$, substantially in the manner and for the purpose described.

7. The revolving disk-feeder K, having openings $K'$, in combination with the receiver G and drum I, in the manner substantially as described.

8. The reciprocating jaw $L'$, having the cutters or checks constructed as described, in combination with the stationary jaw L, with like cutters, and clearing-pins $k'$, in the manner substantially as described.

9. The reciprocating jaw $L'$, rod $n'$, spring $n'''$, plate $s$, and pulley $n^4$, in combination with the nut $n''$, having tooth $n^6$, in the manner substantially as described.

10. In a cube sugar-cutting machine the cutters formed by a series of corrugated edges, to make the checks in the disks, substantially as described.

11. The machine for making cubes or blocks of sugar from the loaf when composed of the slotted reciprocating and reversible feeder D, the two series of circular saws B and B', the sugar disk-receiver G, plunger $g'''$, feeding-disk K, and cutting-jaws L and L', constructed and operating substantially as herein described.

JULIUS KING.

Witnesses:
 OLE HOLBERG,
 JACOB PECARE.